United States Patent [19]

Morozumi et al.

[11] 4,148,982
[45] Apr. 10, 1979

[54] THERMAL MODIFICATION METHOD FOR FLUOROELASTOMERS

[75] Inventors: Mituharu Morozumi, Yokohama; Gen Kojima, Machida; Takeshi Abe, Yokohama, all of Japan

[73] Assignee: Asahi Glass Co. Ltd., Tokyo, Japan

[21] Appl. No.: 813,346

[22] Filed: Jul. 6, 1977

[30] Foreign Application Priority Data

Jul. 16, 1976 [JP] Japan .................................. 51-83973

[51] Int. Cl.² .............................................. C08F 8/06
[52] U.S. Cl. ......................................... 526/58; 526/56; 528/481
[58] Field of Search ................... 528/481; 526/47, 56, 526/58

[56] References Cited

U.S. PATENT DOCUMENTS

| | | | |
|---|---|---|---|
| 2,643,988 | 6/1953 | Walter | 528/481 |
| 2,774,109 | 12/1956 | Kaufman | 528/481 |
| 2,854,490 | 9/1958 | Fischer et al. | 528/481 |
| 3,058,967 | 10/1962 | Nickerson | 528/481 |
| 3,242,246 | 3/1966 | Stand | 528/481 |
| 3,452,126 | 6/1969 | Sieron | 528/481 |
| 3,467,635 | 9/1969 | Brasen et al. | 528/481 |
| 3,558,583 | 1/1971 | Alsup et al. | 528/481 |

*Primary Examiner*—William F. Hamrock
*Attorney, Agent, or Firm*—Oblon, Fisher, Spivak, McClelland & Maier

[57] ABSTRACT

High molecular fluoroelastomers are thermally modified by heating the fluoroelastomer at its thermally degradable temperature in the presence of oxygen under maintaining elasticity. The modified fluoroelastomers have the improved adhesiveness and processability and are easily vulcanized.

10 Claims, 1 Drawing Figure

THERMAL MODIFICATION METHOD FOR FLUOROELASTOMERS

BACKGROUND OF THE INVENTION

1. Field of the Invention

The present invention relates to a thermal modification method for fluoroelastomers. More particularly, it relates to a thermal modification method for fluoroelastomers such as propylene-tetrafluoroethylene copolymers, vinylidene fluoride-hexafluoropropylene copolymers, which comprises heating the fluoroelastomer to degrade it in the presence of oxygen whereby the processability and adhesiveness are improved.

2. Description of the Prior Art

Propylene-tetrafluoroethylene copolymers and vinylidene fluoride-hexafluoropropylene copolymers have been known as crosslinkable and vulcanizable fluoroelastomers having excellent heat resistance and chemical resistance.

Thus, the fluoroelastomers are used for various applications as elastic products having excellent heat resistance and chemical resistance after blending a crosslinking agent, a filler a reinforcing agent or the other additive and crosslinking it by using a chemical crosslinking agent or high energy ionizing radiation etc.

The fluoroelastomers have been composited with various substrates from the viewpoints of excellent heat resistance and chemical resistance and elasticity of the fluoroelastomers. The fluoroelastomers have been continuously molded by an extrusion molding or transfer molding processes. The fluoroelastomers have been used for preparing multi-layer composite products and products having complicated or special shapes.

In accordance with the studies of the inventors, it has not been enough to study an adhesive composition and an adhesion technology for bonding the fluoroelastomer to various substrates. For example, the adhesion of cotton cloth for preparing multi-layer hose and the adhesion of metal for a coated roller have not been satisfactorily attained by using a commercial adhesive composition, and have required to use a special adhesive composition and a complicated operation which sharply increases the cost of manufacture.

In the continuous molding process, various disadvantages have been found in a surface condition, a sectional configuration, a mold fluidity, size accuracy etc., whereby the extruding velocity could not be increased.

SUMMARY OF THE INVENTION

It is an object of the present invention to provide a fluoroelastomer having excellent adhesiveness to various materials.

It is another object of the present invention to provide a fluoroelastomer having an improved processability in a continuous molding operation such as an extrusion molding or transfer molding processes.

It is the other object of the present invention to provide a fluoroelastomer which is easily vulcanized to give a vulcanizate having excellent characteristics.

It is further the other object of the present invention to provide a fluoroelastomer having improved self-adhesiveness and excellent heat resistance and chemical resistance and a fluoroelastomer which is used as an adhesive agent for bonding high molecular weight fluoroelastomers to various substrates.

The foregoing and other objects of the present invention have been attained by heating high molecular fluoroelastomer at its thermally degradable temperature of 250° to 450° C. in the presence of oxygen under maintaining elasticity for longer than 15 minutes.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein FIG. 1 discloses an embodiment of a device for the compression molding of the fluoroelastomer composition of the present invention.

DETAILED DESCRIPTION OF THE PREFERRED EMBODIMENTS

Figure 1:
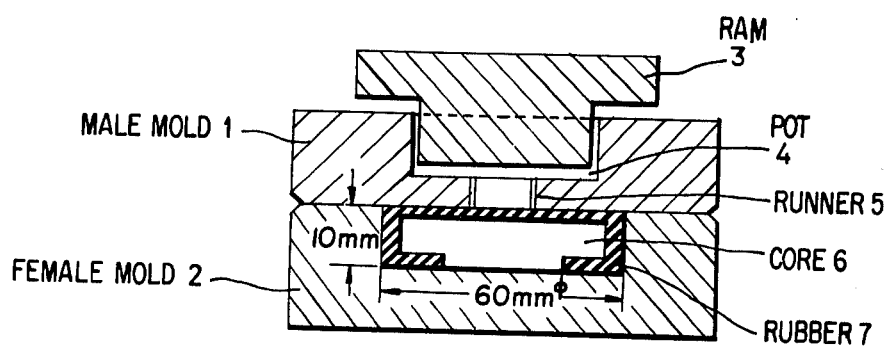

It is not clear that the adhesiveness and processability and fluidity of the fluoroelastomer have been improved by the special heat treatment in the presence of oxygen. Thus, it requires oxygen, and accordingly, it has been considered that it is resulted by not only the degradation of molecules but also the formation of double bond and formation of oxygen containing functional groups such as carbonyl groups by dehydrofluorination which are effectively combined to attain the advantageous results.

The effects of the present invention could not be attained by preparing low molecular fluoroelastomers by a teromerization or molecular weight control by controlling the polymerizing conditions or a chain transferring agent. These descriptions are to be clearly understood the features of the present invention.

In the process of the present invention, it is important to perform the thermal modification method in the presence of oxygen. The effects of the present invention especially the effect of improvement of adhesiveness could not be attained by a heat treatment in vacuum, or in an inert gas atmosphere such as nitrogen gas flow. The content of oxygen is not critical as far as it is effective amount in the thermal modification method. In usual, it is enough to be the content in air. It is disadvantageous in the industrial practice when the content of oxygen is too low or too high. The temperature in the thermal modification should be the thermally degradable temperature for the fluoroelastomers and is selected from a range of 250° to 450° C. depending upon the kind of the fluoroelastomer. The time for the thermal modification should be selected depending upon the temperature in the thermal modification. When it is too short, the effect of the present invention is too low, whereas when it is too long the desired physical properties of the fluoroelastomers are deteriorated to be liquefied. In usual, it can be short when the temperature in the thermal modification is high. It is preferable to be longer than 15 minutes but to maintain elasticity of the degradated fluoroelastomer such as shorter than 48 hours in the industrial practice. It is optimum to be in a range of 30 minutes to 24 hours from the viewpoint of economical operation.

It is possible to perform the thermal modification after adding a small amount of a basic oxide to the fluoroelastomer. The addition of the basic oxide improves the efficiency of the thermal modification. For example, it is possible to decrease the temperature in the thermal modification for about 20° C. or more in comparison with that of no addition of a basic oxide. The time for the thermal modification can be also shortened.

In usual, the amount of the basic oxide is in a range of 0.01 to 5 wt.part preferably 0.1 to 3 wt.parts per 100 wt.parts of the fluoroelastomer. When the amount of the basic oxide is too small, the effect for the addition is not considered. On the other hand, when the amount of the basic oxide is too much, the desired physical characteristics of the fluoroelastomer are disadvantageously deteriorated.

Suitable basic oxides include magnesium oxides, calcium oxides, zinc oxides, copper oxides, silver oxides, tin oxides, lead oxides, barium oxides etc.

The optimum basic oxides used in the present invention are magnesium oxide, zinc oxide, calcium oxide, lead oxide etc.

The basic oxides need not to be the oxides of specific valency and for example, they can be $PbO_2$, $PbO$, $Pb_3O_4$, etc.

The high molecular fluoroelastomers used in the process of the present invention are not critical and can be known ones.

Suitable fluoroelastomers include propylene-tetrafluoroethylene copolymers, vinylidene fluoride-hexafluoropropylene copolymers, vinylidene fluoride-trifluorochloroethylene copolymers, vinylidene-fluoride-pentafluoropropylene copolymers, perfluoroalkyl acrylate elastomers, fluorinated nitroso-elastomers, fluorinated siloxane-elastomers, tetrafluoroethylene-vinylidene fluoride-propylene copolymers, tetrafluoroethylene-ethylene-isobutylene copolymers, ethylene-hexafluoropropylene copolymers, tetrafluoroethylene-butene-1 copolymers, tetrafluoroethylene-ethylvinyl ether copolymers, fluorinated phosphonitrile elastomers, tetrafluoroethylene-fluorovinyl ether copolymers, ethylene-3,3,3-trifluoropropylene copolymer, etc.

The high molecular fluoroelastomers used in the present invention have usually more than 30,000 preferably about 50,000 to 400,000 especially about 100,000 to 250,000 of a number average molecular weight.

In the present invention, it is especially preferable to use addition polymers such as propylene-tetrafluoroethylene copolymers and vinylidene fluoride-hexafluoropropylene copolymers as the fluoroelastomers.

The high molecular fluoroelastomers can be various kinds which can be prepared by a bulk polymerization, a suspension polymerization, an emulsion polymerization, a solution polymerization, a catalytic polymerization using a polymerization initiator, a high energy ionizing radiation polymerization, a redox polymerization etc.

Suitable propylene-tetrafluoroethylene copolymers as the fluoroelastomer can be copolymers of tetrafluoroethylene and propylene as main components with a copolymerized component such as ethylene, isobutylene, acrylic acid, alkyl esters of acrylic acid, methacrylic acid, alkyl esters of methacrylic acid, vinyl fluoride, vinylidene fluoride, hexafluoropropylene, chloroethyl vinyl ether, chlorotrifluoroethylene, perfluoroalkyl vinyl ether, etc.

The molar ratio of the components of tetrafluoroethylene propylene and the other additional component and the molecular weight of the copolymer can be selected depending upon the usages of the treated elastomers, desired characteristics of the elastomers such as heat resistance and chemical resistance and availability of the elastomers.

For example, it is preferable to use the propylene-tetrafluoroethylene copolymers having a molar ratio of $C_2F_4/C_3H_6$ of 99/1 to 10/90 preferably 95/5 to 30/70 especially 90/10 to 45/55 from the viewpoint of excellent heat resistance which is the characteristics of the copolymers. The content of the other component is in a range of 0 to 50 mole % preferably 0.5 to 40 mole %.

The number average molecular weight of the copolymer is usually more than 50,000. The copolymers having suitable molecular weight can be advantageously used for desirable usages. For example, propylene-tetrafluoroethylene copolymers having more than 70,000 preferably 100,000 to 250,000 of a number average molecular weight are preferably used in the process of the present invention.

Suitable vinylidene fluoride-hexafluoropropylene copolymers as the elastomer can be copolymers of vinylidene fluoride and hexafluoropropylene as main components with a copolymerized component such as tetrafluoroethylene, perfluorovinyl ether, acrylic acid, alkyl esters of acrylic acid, methacrylic acid, alkyl esters of methacrylic acid, etc. It is preferable to use the vinylidene fluoride-hexafluoropropylene copolymers having a molar ratio of $CH_2=CF_2/CF_2=CF-CF_3$ of 95/5 to 40/60 preferably 90/10 to 60/40. The content of the other component such as tetrafluoroethylene, perfluorovinyl ether etc. is in a range of 0 to 4 mole % preferably 10 to 30 mole %.

The number average molecular weight of the copolymer is usually more than 50,000, preferably more than 70,000, especially 100,000 to 250,000.

In the process of the present invention, the modified fluoroelastomer can be dried, after the thermal modification under a reduced pressure at the temperature causing no thermal degradation. The temperature for drying the modified fluoroelastomer is lower than the temperature causing degradation of the modified fluoroelastomer and it is selected from the range of the room temperature to 200° C. depending upon the kind of the modified fluoroelastomer. The time for drying step is depending upon the drying temperature and it is usually shorter at higher temperature and it is usually in a range of 15 minutes to 48 hours, preferably shorter than 24 hours especially about 30 minutes to 10 hours in the industrial practice from the viewpoint of economy in the operation. The degree of the reduced pressure is usually less than 100 mmHg preferably less than 50 mmHg especially less than 10 mmHg.

The modified fluoroelastomers obtained in the process of the present invention can be effectively used as an adhesive agent for bonding the high molecular fluoroelastomers to various substrates and also for bonding the same kinds or different kinds of the fluoroelastomers.

The modified fluoroelastomers obtained by the heat treatment of the present invention can be effectively used as the adhesive agent in the preparation of the composite products by bonding a fluoroelastomer such as propylene-tetrafluoroethylene copolymers, vinylidene fluoride-hexafluoropropylene copolymers to a metal substrate such as soft steel, stainless steel, cast iron, brass; a cloth substrate such as cotton cloth, polyamide cloth, aromatic polyamide cloth, polyester cloth; a fluorinated resin such as polytetrafluoroethylene, ethylene-tetrafluoroethylene copolymer; or a other substrate such as the other resin, glass fiber, asbestos, commercial natural rubber, synthetic rubbers etc.

The vulcanizing adhesion to various substrates can be attained by using the adhesive agent prepared by adding a vulcanizing agent to the modified fluoroelastomer as described below.

The high molecular fluoroelastomer can be bonded to various substrates under vulcanization by using an adhesive composition prepared by admixing the modified fluoroelastomer with a vulcanizing agent such as a peroxy compound and/or a polyfunctional compound or an amine compound, a polyhydroxyl aromatic compound etc.

The modified fluoroelastomers of the present invention can be used as the adhesive agent for the high molecular fluoroelastomers, and also can be used for preparing molded products such as sheets, pipes, rods, tubes, angles, channels etc. by the continuous molding processes such as the extrusion process and the transfer process. The modified fluoroelastomers can be also molded to various products having special shape and condition such as sponge rubber by various molding processes.

The molded products of the modified fluoroelastomers of the present invention can be vulcanized by suitable vulcanizing manners described below.

Thus, the vulcanized rubber products made of the fluoroelastomer can be prepared by using the modified fluoroelastomer of the present invention. The vulcanizing agents and vulcanizing manners described below can be also applied for the modified fluoroelastomers and the high molecular fluoroelastomers in the vulcanizing adhesion.

In accordance with the process of the present invention, the vulcanized products can be prepared by adding suitable vulcanizing agent of a crosslinking agent or high energy ionizing radiation etc.

For example, chemical crosslinking agents of peroxy compounds can be used.

Suitable peroxy compounds include monoperoxides such as diacyl peroxides such as dibenzoyl peroxide; peroxy esters such as dicumyl peroxide, di-t-butyl peroxide, t-butyl peroxyacetate, t-butyl peroxyisopropyl carbonate, t-butyl peroxybenzoate; and diperoxides such as 2,5-dimethyl-2,5-di-(t-butylperoxy)-hexine-3,2,5-dimethyl-2,5-di-(t-butyl peroxyl)-hexane; $\alpha,\alpha'$-bis-(t-butylperoxy)-p-diisopropyl benzene; 2,5-dimethyl-2,5-di-(benzoyl peroxy)-hexane etc. One or more peroxy compounds can be used.

The amount of the chemical crosslinking agent is usually in a range of 0.1 to 20 wt.parts preferably 1 to 10 wt.parts per 100 wt.parts of the modified fluoroelastomer or the high molecular fluoroelastomer.

The crosslinking can be attained by high energy ionizing radiation such as $\alpha$-rays, $\beta$-rays, $\gamma$-rays, neutrons, accelerated charged particles, X-rays, electron beams etc. It is preferable to use $\gamma$-rays, accelerated charged particles, electron beams emitted from cobalt-60.

The modified fluoroelastomers or the high molecular fluoroelastomers can be converted to crosslinked copolymers by the high energy ionizing radiation in a dose rate of $10^2$ to $10^9$ roentgen per hour, especially $10^3$ to $5 \times 10^7$ roentgen per hour and a total dose of $10^4$ to $10^8$ especially $10^6$ to $5 \times 10^7$ rad.

The high energy ionizing radiation can be performed in air or in vacuum or in an inert atmosphere such as argon, helium or nitrogen gas flow or in water. The crosslinking reaction by the high energy ionizing radiation is effectively performed at about ambient or room temperature. The temperature in the radiation is not critical and can be lower than the room temperature or at about 100° C.

In the crosslinking reaction using amines, alkyl polyamines such as hexamethylenediamine, tetraethylene pentamine, triethylene tetramines; amine salts of carbamic acid or cinnamylidene acids; aromatic polyamines such as piperazine, piperidine, pyridine, aniline, phenanthroline; and aromatic polyamine salts; Schiff base. It is also possible to use nucleophilic reagents such as hydroquinone, bisphenol A and alkali metal salts or ammonium salts thereof with an auxiliary agent of straight chain polyethers such as polyethyleneglycol, polypropyleneglycol and cyclic polyethers, quaternary ammonium salts, quaternary phosphonium salts.

In the crosslinking reaction of fluoroelastomers of propylene-tetrafluoroethylene copolymer or the modified fluoroelastomers, the known crosslinking auxiliary agent can be added in the high energy ionizing radiation or the chemical crosslinking reaction. For example, the crosslinking auxiliary agent such as allyl compounds, sulfur, organic amines, maleimides, methacrylates, divinyl compounds can be used. It is preferable to use organic allyl compounds such as diallyl phthalate, triallyl phosphate, triallyl cyanurate, triallyl isocyanurate, diallyl melamine; oximes such as parabenzoquinone dioxime, p-p'-dibenzoyl benzoquinone dioxime etc. It is optimum to use allyl compounds. The amount of the crosslinking auxiliary agent is usually in a range of 0.1 to 20 wt.parts preferably 0.2 to 10 wt.parts per 100 wt.parts of the modified fluoroelastomer or high molecular fluoroelastomer.

In the present invention, various additives used in the conventional crosslinking reaction can be added in the crosslinking reaction of the fluoroelastomer with the crosslinking agent. The additives include metal oxides such as magnesium oxide, lead oxide; reinforcing agents such as carbon black, fine silica; fillers pigments antioxidants, stabilizers etc.

In the addition of these additives, it is preferable to uniformly mix the chemical crosslinking agent, the crosslinking auxiliary agent or the other additive. The uniform mixture can be prepared by using the conventional roller mill for rubber kneading process or the Bambury mixer. The condition for the mixing step is not critical. These components can be uniformly dispersed and mixed in the modified fluoroelastomers or high molecular fluoroelastomers at about 30° to 80° C. for about 10 to 60 minutes.

The other additives can be mixed during the kneading step or before or after the kneading step.

The condition of the operation in the kneading step can be selected depending upon the kinds of the raw materials and the additives and the purposes.

In the invention, the operation in the thermal crosslinking reaction with the chemical crosslinking agent, the conventional operation can be employed. For example, the mixure is heated in a mold under high pressure or the unvulcanized composition is compressed into a mold and it is heated under high pressure. It is also possible to mold the unvulcanized composition by an extrusion molding process, a calender roll mill process, or an injection molding process and then to heat the molded composition in an oven or a steam oven. The condition of the thermal crosslinking reaction can be selected depending upon the kinds of the raw materials and the formulation. The temperature in the crosslinking reaction is usually in a range of about 80° to 250° C. preferably 120° to 200° C. The heating time is not critical and it is usually in a range of 3 minutes to 3 hours preferably 5 minutes to 2 hours depending upon the chemical crosslinking agent. When the temperature is higher, the heating time can be shorten. The second heat treatment of the crosslinked product can be performed to improve physical characteristics of the product. For example, the second heat treatment is performed at 150° to 250° C. preferably 180° to 230° C. for about 0.5 to 25 hours.

When the modified fluoroelastomer is used for adhesion to various substrates, the composition prepared by adding a crosslinking agent, a crosslinking auxiliary agent, a filler and other additive as required, is preferably formed in a form of a sheet having a thickness of about 0.1 to 0.5 mm or is used in a form of solution in suitable solvent. In particularly, the surface is treated by a sand blast or sand paper treatment and the treated surface is dewaxed by using acetone, trichloroethylene or vapor thereof. The adhesive composition is coated for one time with a brush and then, it is dried at the room temperature for longer than 2 hours or at lower than 80° C. After drying the surface, the unvulcanized and modified fluoroelastomer is superposed on the surface and the vulcanizing adhesion is performed.

When the modified fluoroelastomer is adhered on a metal by a compress-molding process, the modified fluoroelastomer is coated on a substrate and then, it is heated at 150° to 160° C. for shorter than 10 minutes to form a strong coated film.

When fiber such as cotton cloth, nylon or polyethyleneterephthalate cloth is used as the substrate, the adhesive composition is coated on the substrate it is immersed in the substrate and then, the vulcanizing adhesion is performed after drying the coated or immersed product. In the adhesion, it is possible to apply a primer on the substrate.

The typical usages of the adhered composites of various substrates are as follows.

Rollers, gaskets, packings, hoses, diaphragms etc. can be obtained by the adhesion on a mild steel. Diaphragms, hose, coated cloth, belts etc. can be obtained by the adhesion on cotton cloth, nylon, polyester or vinyl resin substrate. Gaskets, packings etc. can be obtained by the adhesion with fluorinated resin. Rollers, hoses etc. can be obtained by the adhesion with other resins.

The following examples are intended merely to describe specific embodiments of the present invention and are not to be construed as a limitation on the scope of the invention.

In the examples, the adhesive strength is measured as follows. A composition prepared by mixing 100 wt.parts of propylene-tetrafluoroethylene copolymer having a molar ratio of $C_3H_6/C_2F_4$ of 55/45 and a number average molecular weight of 180,000 as the elastomer with 2 wt.parts of $\alpha$, $\alpha'$-bis(t-butylperoxide)-p-diisopropyl benzene, 3 wt.parts of triallyl isocyanurate and 35 wt.parts of MT carbon, was used. The composition was coated on mild steel with an adhesive agent by the vulcanizing adhesion. The adhesive strength was measured by preparing a sample in accordance with Japanese Industrial Standard K 6301 of 90 degree peeling off test. Accordingly, the adhesive strength to a metal was measured as the 90 degree peeling off test and the adhesive strength to a substrate of fiber etc. was measured as the 180 degree peeling off test.

The vulcanizing adhesion was performed at 160° C. for 30 minutes under a press pressure of 120 kg/cm$^2$. The 90 degree peeling off strength was measured as the adhesive strength and was shown by the unit of kg/cm.

The processability was measured as follows. In accordance with ASTM the extrusion test by Garvey die, the conditions of the sectional part (foam, swell) edge, surface and corner were evaluated. Moreover, the extruding velocity and the die swell were measured.

In accordance with ASTM D-2231, A method, the compositions were extruded by Garvey extrusion under the optimum condition. The result were rated by the rating of 1 to 4 (4:best). The measured values in the Garvey extrusion are shown as the extrusion velocity and the die swell.

EXAMPLES 1 TO 4 AND REFERENCES 1 TO 3

Propylene-tetrafluoroethylene copolymer having a molar ratio of $C_2F_4/C_3H_6$ of 55/45 and a number average molecular weight of 180,000 was heated at 360° C. for 2 hours in air atmosphere in an electric oven, to obtain the modified fluoroelastomer.

A composition (A) was prepared by mixing 100 wt. parts of the modified fluoroelastomer with 5 wt.parts of a vulcanizing agent (Peroximon F-100) ($\alpha,\alpha'$-bis(t-butylperoxy)-p-diisopropyl benzene), 3 wt.parts of triallyl isocyanurate (auxiliary agent) and 25 wt.parts of MT-carbon.

The composition A was sheeted. On the other hand, the composition A was dissolved to form a tetrahydrofuran solution (solid content: 15%).

Mild steel, cotton cloth and polyethyleneterephthalate cloth were used as substrates. The adhesive strengths of propylene-tetrafluroethylene copolymer (fluoroelastomer) having a molar ratio of $C_2F_4/C_3H_6$ of 55/45 and a number average molecular weight of 180,000 adhered to the substrates with the adhesive composition A were measured.

The fluoroelastomer and the substrates were respectively adhered by applying the sheet or solution of the composition A between them and heated for the vulcanizing adhesion.

As the References, the composition A was not used but a commercial rubber adhesive agent was used. The results are shown in Table 1.

Table 1

| | Form | Adhesive strength (kg/cm) |
|---|---|---|
| Exp. 1 | Cotton cloth/Sheet A/Fluoroelastomer | 3.0 |
| Exp. 2 | Cotton cloth (Metalock P)/Solution A/ Fluoroelastomer | 5.0 |
| Exp. 3 | Mild steel/Metalock P/Solution A/ Fluoroelastomer | 8.0 |
| Exp. 4 | Polyethylene terephthalate cloth/Solution A/Fluoroelastomer | 2.0 |
| Ref. 1 | Cotton cloth/Kemulock 607/Fluoroelastomer | 0.5 |
| Ref. 2 | Cotton cloth/Fluoroelastomer | >1.0 |
| Ref. 3 | Mild steel/Metalock P/Fluoroelastomer | 3.0 |

EXAMPLE 5 AND REFERENCE 4

The propylene-tetrafluoroethylene copolymer of Example 1 was heated at 320° C. for 4 hours in air to obtain the modified fluoroelastomer.

A composition was prepared by mixing 100 wt.parts of the modified fluoroelastomer with 2 wt.parts of $\alpha,\alpha'$-bis(t-butylperoxy)-p-diisopropyl benzene (Peroximon F-100) 3 wt.parts of triallyl isocyanurate 35 wt.parts of MT-carbon and 1 wt.part of stearic acid. The composition was tested by Garvey extrusion test. As the reference, the preparation was repeated by substituting the modified fluoroelastomer with the non-modified fluoroelastomer. The results are shown in Table 2.

Table 2

| Garvey extrusion test | Example 5 | Reference 4 |
| --- | --- | --- |
| Sectional part condition | 4 | 2 |
| Edge condition | 3 | 2 |
| Surface condition | 4 | 2 |
| Corner condition | 4 | 3 |
| Extrusion velocity | 5 m/min. | 0.5 m/min. |
| Die swell | 45 | 80–100 |

EXAMPLE 6 AND REFERENCE 3

A mold compress molding test was carried out by using the compositions prepared in Example 5 and Reference 4. The shape of the mold is shown in FIG. 1. The results are shown in Table 3.

Table 3

|  | Example 6 | Reference 5 |
| --- | --- | --- |
| Compressed pressure | 200 kg/cm$^2$ | 800 kg/cm$^2$ |
| Demolding property | good | bad |
| Surface condition | good | Weld lines |

EXAMPLE 7

A fluoroelastomer of vinylidene fluoride-hexafluoropropylene-tetrafluoroethylene copolymer having a molar ratio of $CH_2=CF_2/CF_2=CF-CF_3/C_2F_4$ of 60/30/10 and a number average molecular weight of 100,000 was heated at 380° C. for 2 hours to obtain the modified fluoroelastomer.

A composition was prepared by mixing 100 wt.parts of the modified fluoroelastomer with 3 wt.parts of Diak #3; 15 wt.parts of magnesium oxide (Kyowamag #40) and 20 wt.parts of MT-carbon and dissolving the mixture in methyethyl-ketone (solid content 15%).

The vulcanizing adhesion of the polyethyleneterephthalate cloth to the non-modified fluoroelastomer coated with the composition was tested in the condition and the evaluation of Example 4. The adhesive strength was 2.0 kg/cm. When the modified fluoroelastomer was not added, the adhesive strength was 0.5 kg/cm.

EXAMPLE 8

The tests of Example 3 were repeated by using a modified fluoroelastomer prepared by heating tetrafluoroethylene/propylene/vinylidene fluoride copolymer having a molar ratio of $C_2F_4/C_3H_6/CH_2=CF_2$ and a number average molecular weight of 70,000 at 340° C. for 4 hours.

The adhesive strength was 7.5 kg/cm. When the modified fluoroelastomer was not added, the adhesive strength was about 2.5 kg/cm.

EXAMPLE 9

Propylene-tetrafluoroethylene copolymer having a molar ratio of $C_2F_4/C_3H_6$ of 55/45 and a number average molecular weight of 180,000 was admixed with 0.5 wt.part of magnesium oxide to 100 wt.parts of the copolymer by a roller mill having 8 inch roller and the mixture was heated at 300° C. for 2 hours in air atmosphere in an electric oven to obtain the modified fluoroelastomer.

A composition was prepared by mixing 100 wt.parts of the unmodified fluoroelastomer with 5 wt.parts of $\alpha,\alpha'$-bis(t-butylperoxy)-p-diisopropyl benzene (Peroximon F-100)(vulcanizing agent) 3 wt.parts of triallyl isocyanurate (auxiliary agent) and 25 wt.parts of MT carbon.

The Garvey extrusion and the press vulcanization of the composition were carried out to test the appearance of the extruded product and the physical properties of the vulcanized product. The vulcanizations were carried out by the press vulcanization at 160° C. for 30 minutes or the oven vulcanization at 160° C. for 1 hour, 180° C. for 1 hour and 200° C. for 2 hours.

The results are shown in Table 4.

Table 4

| Garvey extrusion test barrel 50° C. head 70° C. | |
| --- | --- |
| Sectional part condition | 4 |
| Edge condition | 4 |
| Surface condition | 3 |
| Corner condition | 4 |
| Extrusion velocity (m/min) | 2.3 |
| Die swell (%) | 38 |
| Physical properties | |
| Tensile strength | 185 kg/cm$^2$ |
| Elongation | 260% |
| 100% modulus | 32 kg/cm$^2$ |
| Hardness (JIS-A) | 70 |
| Compression set (200° C.; 22 hours) | 22% |

EXAMPLES 10 TO 13

The metal oxides shown in Table 5 were respectively added to the copolymer of Example 9 and the mixtures were heated to obtain the modified fluoroelastomers.

The Garvey extrusion tests were carried out by using the modified fluoroelastomers.

The results are shown in Table 5.

Table 5

|  | Exp. 10 | Exp. 11 | Exp. 12 | Exp. 13 |
| --- | --- | --- | --- | --- |
| Additive | CaO | ZnO | PbO | MgO |
| Amount (PHR) | 0.5 | 0.1 | 1.0 | 1.0 |
| Temperature for heat treatment | 300° C. | 320° C. | 290° C. | 290° C. |
| Time for heat treatment | 2 hr | 4 hr | 4 hr | 4 hr |
| Garvey extrusion test barrel 50° C. head 70° C. | | | | |
| Sectional part condition | 4 | 4 | 4 | 4 |
| Edge condition | 4 | 3 | 4 | 4 |
| Surface condition | 4 | 3 | 4 | 4 |
| Corner condition | 4 | 4 | 4 | 4 |
| Extrusion velocity | 1.5 m/min | 2.3 m/min | 1.8 m/min | 2.0 m/min |
| Die swell | 60 | 50 | 60 | 35 |

EXAMPLE 14

Vinylidene fluoride/hexafluoropropylene/tetrafluoroethylene copolymer having a molar ratio of $CH_2=CF_2/CF_2=CF-CF_3/C_2F_4$ of 60/30/10 and a mooney viscosity (100° C.) $ML_{1+4}$ of 120 was admixed with 0.5 wt.part of magnesium oxide. The mixture was heated at 300° C. for 3 hours to obtain the modified fluoroelastomer. A composition was prepared by mixing 100 wt.parts of the modified fluoroelastomer with 3 wt.parts of Diak #3, 15 wt.parts of magnesia and 20 wt. parts of MT carbon, and the mixture was compress-molded by using the mold shown in FIG. 1.

The compression mold comprises a male mold (1), a female mold (2), a ram (3), a pot (4), a runner (5), a core (6) and a rubber (7).

When the non-modified fluoroelastomer was used, the compress pressure of 300 kg/cm$^2$ was required and the weld lines were found on the molded product. On the other hand, when the modified fluoroelastomer was used, the compress pressure of 150 kg/cm$^2$ was enough, and the weld lines were not substantially found.

What is claimed is:

1. A method for thermally modifying a fluoroelastomer, which comprises:
   heating a fluoroelastomer selected from the group consisting of propylene-tetrafluoroethylene based copolymers, vinylidene-fluoride-hexafluoropropylene based copolymers, vinylidenefluoride-pentafluoropropylene based copolymers, and vinylidenefluoride-trifluorochloroethylene based copolymers having a number average molecular weight of more than 30,000 at a temperature at which it thermally degrades ranging from 250° to 450° C. for more than 15 minutes in the presence of oxygen while maintaining the elasticity of said fluoroelastomer.

2. The method of claim 1, wherein said fluoroelastomer is an addition polymer.

3. The method of claim 1, wherein said propylene-tetrafluoroethylene based copolymer is heated at a temperature at which it thermally degrades ranging from 250° to 450° C. for 15 minutes to 24 hours.

4. The method of claim 1, wherein said vinylidene-fluoride-hexafluoropropylene base copolymer or said vinylidenefluoride-pentafluoropropylene based copolymer is heated at a temperature at which it thermally degrades ranging from 270° to 450° C. for 15 minutes to 24 hours.

5. The method of claim 1, wherein said vinylidene-fluoride-trifluorochloroethylene based copolymer is heated at a temperature at which it thermally degrades ranging from 250° to 450° C. for 15 minutes to 24 hours.

6. The method of claim 1, wherein the thermal modification is conduted at a temperature of 250° to 450° C. for 5 minutes to 24 hours in air.

7. A thermally modified fluoroelastomer prepared by heating a fluoroelastomer selected from the group consisting of proplylene-tetrafluoroethylene based copolymers, vinylidene-fluoride-hexafluoropropylene based copolymers, vinylidene-fluoride-pentafluoropropylene based copolymers, and vinylidene-fluoride-trifluorochloroethylene based copolymers having a number average molecular weight of more than 30,000 at a temperature at which it thermally degrades ranging from 250° to 450° C. for more than 15 minutes in the presence of oxygen while maintaining the elasticity of said fluoroelastomer.

8. A material suitable for the preparation of a vulcanized product, which comprises:
   a mixture of the thermally modified fluoroelastomer of claim 7 with a cross-linking agent.

9. The material of claim 8, wherein said mixture further comprises the presence of an auxiliary agent.

10. A material suitable for the preparation of a molding composition, which comprises:
    the thermally modified fluoroelastomer of claim 7 in admixture with a filler.

* * * * *